Patented Feb. 11, 1947

2,415,444

UNITED STATES PATENT OFFICE 2,415,444

PROCESS OF PRODUCING TETRAETHYL LEAD

George F. Ruddies, Chicago, Ill.

No Drawing. Application August 21, 1942,
Serial No. 455,621

4 Claims. (Cl. 260—437)

The present invention relates to methods of producing alkyl metal compounds, particularly lead alkyls, such as tetraethyl lead.

According to usual methods of preparation, the tetraethyl lead during production and purification is in part decomposed and obtained in decreased yield due to oxidation, steam distillation procedures, and so forth and it often contains by-products or impurities reducing its effectiveness as an anti-knock agent in gasoline or other fuel mixtures.

It is among the objects of the present invention to prepare metal alkyls and particularly tetraethyl lead in increased yields in greater state of purity at reduced cost of production.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found satisfactory to treat an alkali metal-heavy metal alloy with alkyl halide in the presence of a hydrogen halide.

After the reaction has been completed, the metal alkide which is produced may be readily removed by vacuum distillation, and it is not necessary to remove it by steam distillation.

Among the preferred procedures are to combine mono-sodium lead alloy with ethyl chloride in the presence of hydrochloric acid. Hydro-bromic acid could also be utilized for such atmosphere although it is quite expensive. The atmosphere during the reaction should preferably be hydrogen chloride.

The hydrogen chloride should always be added slowly and it may be added after the introduction of the ethyl chloride to the lead alloy, or proportioned together with the ethyl chloride, if desired.

Although various proportions may be utilized, it has been found satisfactory according to one embodiment to utilize about 300 parts by weight of the alloy for every 200 to 300 parts by weight of ethyl chloride and sufficient hydrogen chloride to form the atmosphere and to acidify the ethyl chloride during the reaction. The hydrogen chloride should be added with constant agitation and cooling.

After this reaction by vacuum distillation, it is possible to recover between 300 to 500 parts of the lead tetraethyl.

The temperature may be maintained between 0 and 12° C. at the start. If necessary, additional cooling means may be provided for the reaction or may be controlled by means of the application of brine or dry ice. Even at temperatures as low as —70° C. in the second procedure a satisfactory reaction is obtained upon such cooling.

By so producing the lead ethide, other heavy metal alkyls or tetraethyl lead in the presence of a hydrogen chloride atmosphere, a fast reaction and a very high yield is obtained of a most pure tetra-alkyl lead which may be readily incorporated in gasoline or preserved according to methods hereafter described, for future requirements.

The vessel in which the lead tetraethyl is produced is generally subjected to a vacuum to remove all the air and then the molten sodium lead alloy is introduced in a cooled granular condition, preferably downwards pouring from the melting vessel at a certain angle through a cooling medium jacketed metal tube to cool, divide and remove the heat of the alloy material; ethyl chloride is added thereto and slowly hydrogen chloride forming the atmosphere to complete the reaction efficiently.

The material is free of impurities and by-products which decreases its effectiveness and the vacuum distillation results in the production of a most satisfactory tetra-alkyl lead compound.

The reaction may be carried on under vacuum or under atmospheric pressure or under pressures varying from 15 inches vacuum to 15 to 30 lbs. above atmospheric.

The vacuum distillation may be carried out at various pressures varying from zero to ¾ atmospheric and preferably as near zero as possible.

The present application is similar in subject matter to application Serial No. 232,804, filed October 1, 1938, now Patent No. 2,277,781, issued March 31, 1942, and application Serial No. 435,297, filed March 19, 1942.

What is claimed is:

1. A process of producing a heavy metal alkide which comprises reacting a lead-alkali metal alloy with an alkyl halide in an atmosphere of a hydrogen halide.

2. A process of producing a lead alkyl which comprises reacting a lead-sodium alloy with an alkyl halide in an atmosphere of a hydrogen halide.

3. A process of producing a tetraethyl lead which comprises reacting a lead-sodium alloy with an ethyl chloride in an atmosphere of a hydrogen chloride.

4. A process of making tetraethyl lead which comprises reacting together a sodium lead alloy and ethyl chloride in an atmosphere of hydrogen chloride and then recovering the tetraethyl lead by vacuum distillation in the absence of water and substantially devoid of oxygen.

GEORGE F. RUDDIES.

REFERENCES CITED

The following references are of record in the file of this patent:

UNITED STATES PATENTS

| Number | Name | Date |
|---|---|---|
| 1,697,245 | Krans et al. | Jan. 1, 1929 |
| 2,277,781 | Ruddies | Mar. 31, 1942 |
| 1,074,747 | Rowe | Oct. 7, 1913 |
| 1,333,029 | McIntyre | Mar. 9, 1920 |
| 1,415,351 | Howard | May 9, 1922 |
| 1,938,180 | Groll | Dec. 5, 1933 |

FOREIGN PATENTS

| Number | Country | Date |
|---|---|---|
| 481,498 | British | Mar. 7, 1938 |

OTHER REFERENCES

Calingaert, et al., "Jour. Am. Chem. Soc." 61 2756 and 7 (1939).